(12) United States Patent
Long et al.

(10) Patent No.: US 9,267,597 B2
(45) Date of Patent: Feb. 23, 2016

(54) SYSTEM FOR ADJUSTING FLUID VOLUME IN A TRANSMISSION AND METHOD THEREOF

(71) Applicant: Allison Transmission, Inc., Indianapolis, IN (US)

(72) Inventors: Charles F. Long, Avon, IN (US); Randall S. Conn, Avon, IN (US); Jeffrey E. Shultz, Zionsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 128 days.

(21) Appl. No.: 14/150,061

(22) Filed: Jan. 8, 2014

(65) Prior Publication Data

US 2015/0192201 A1 Jul. 9, 2015

(51) Int. Cl.
*F16H 61/00* (2006.01)
*F16D 57/06* (2006.01)

(52) U.S. Cl.
CPC ............ *F16H 61/0025* (2013.01); *F16D 57/06* (2013.01); *F16H 2061/0034* (2013.01)

(58) Field of Classification Search
None
See application file for complete search history.

(56) References Cited

U.S. PATENT DOCUMENTS

| | | | |
|---|---|---|---|
| 4,753,332 A | 6/1988 | Bieber et al. | |
| 5,000,300 A | 3/1991 | Klemen et al. | |
| 5,337,848 A * | 8/1994 | Bader | 180/65.25 |
| 2003/0045396 A1 * | 3/2003 | Carlson et al. | 477/107 |
| 2009/0019845 A1 | 1/2009 | Bovina et al. | |
| 2013/0263584 A1 | 10/2013 | Otanez et al. | |

FOREIGN PATENT DOCUMENTS

JP 2004301249 A 10/2004

OTHER PUBLICATIONS

From the International Searching Authority; "Notification Transmittal of the International Search Report and the Written Opinion of the International Searching Authority, or the Declaration"; Dated: Oct. 13, 2014; pp. 1-15.

* cited by examiner

*Primary Examiner* — Edwin A Young
(74) *Attorney, Agent, or Firm* — Taft Stettinius & Hollister LLP; Stephen F. Rost

(57) ABSTRACT

The present disclosure provides a method for increasing a volume of hydraulic fluid in a reservoir of a transmission. The method includes providing a retarder mounted to the transmission, an accumulator including an internal cavity, a piston disposed in the internal cavity of the accumulator, a solenoid, a valve, and a controller. The method also includes enabling the solenoid from an off state to an on state, transferring fluid pressure from the valve to the piston, and moving the piston from a first position to a second position in the internal cavity. The method further includes discharging an amount of hydraulic fluid from the internal cavity of the accumulator to the reservoir and increasing the volume of hydraulic fluid in the reservoir.

20 Claims, 5 Drawing Sheets

SYSTEM FOR ADJUSTING FLUID VOLUME IN A TRANSMISSION AND METHOD THEREOF

FIELD OF THE DISCLOSURE

The present disclosure relates to a transmission system, and in particular to a system and method of adjustably fluid volume in a transmission.

BACKGROUND

Transmissions are used in vehicles to transfer torque from a drive unit to a vehicle load. For example, many transmissions transfer the torque from a vehicle engine to a vehicle load produced at the interface of the vehicle's wheels when a vehicle is being driven along a road. Typical transmissions include a gear train that is reconfigurable among a number of gear ratios to establish a particular rotational drive ratio between the vehicle engine and the vehicle load. A transmission system can include additional features such as a retarder to affect overall performance. A retarder, for example, can be any device used to assist or replace a primary braking system on a vehicle.

At colder temperatures, fluid internal to the transmission and retarder can have a greater viscosity. In some transmission systems, fluid can be trapped or accumulated in different portions of the system. In these instances, there is generally less fluid in a reservoir or sump of the transmission system readily available to apply clutches and the retarder as desired. This can be particularly problematic at colder temperatures when the fluid viscosity is high and there is less fluid available to pump throughout the system.

SUMMARY

In one embodiment of the present disclosure, a method is provided for increasing a volume of hydraulic fluid in a reservoir of a transmission. The method includes providing a retarder mounted to the transmission, an accumulator including an internal cavity, a piston disposed in the internal cavity of the accumulator, a solenoid, a valve, and a controller; enabling the solenoid from an off state to an on state; transferring fluid pressure from the valve to the piston; moving the piston from a first position to a second position in the internal cavity; discharging an amount of hydraulic fluid from the internal cavity of the accumulator to the reservoir; and increasing the volume of hydraulic fluid in the reservoir.

In one example of this embodiment, the method includes detecting a fluid temperature with a sensor; and comparing the detected fluid temperature to a temperature threshold. In a second example, the enabling step is performed only if the detected fluid temperature is less than the temperature threshold. In a third example, the method includes storing the detected fluid temperature in a memory of the controller. In a fourth example, the method includes locating a previously detected fluid temperature from a memory of the controller; and comparing the previously detected fluid temperature to a temperature threshold.

In a fifth example, the method includes determining a time threshold; and enabling the solenoid in the on state for a period of time equivalent to the time threshold. In a sixth example, the method includes determining an input speed of the transmission and a speed threshold; comparing the input speed to the speed threshold; and enabling the solenoid to the on state as long as the input speed is less than the speed threshold. In a seventh example, the method includes maintaining the piston in the second position to prevent hydraulic fluid in the transmission from returning to the internal cavity of the accumulator. In an eighth example, the method includes preventing any use of the retarder while the solenoid is enabled.

In another embodiment, a vehicular system includes a drive unit; a transmission coupled to the drive unit for receiving power; a controller for controlling the transmission, the controller including a memory and a processor; a hydraulic control system of the transmission including a reservoir, a pump, and a control circuit; a retarder operably coupled to the transmission; an accumulator fluidly coupled to the control circuit, reservoir and retarder, the accumulator including a defined internal cavity for receiving hydraulic fluid; a piston disposed within the internal cavity, the piston being movable between a first position and a second position; and a valve and a solenoid in fluid communication with the piston, the solenoid being in electrical communication with the controller such that the solenoid is controllable between an on state and an off state; wherein, in the off state the piston is free to move between the first and second positions so that hydraulic fluid can enter the internal cavity of the accumulator, and in the off state the piston is moved to the second position to discharge any hydraulic fluid from the internal cavity of the accumulator to the reservoir.

In one example, a set of instructions is stored in the memory and executable by the processor to detect a fluid temperature, compare the detected fluid temperature to a temperature threshold, and trigger the solenoid from the off state to the on state. In a second example, the set of instructions stored in the memory is executable by the processor to determine a time threshold, trigger a clock at t=0, and energize the solenoid in the on state from t=0 to t=time threshold. In a third example, a set of instructions is stored in the memory and executable by the processor to compare a previously recorded fluid temperature to a temperature threshold, determine a current input speed, compare the current input speed to a speed threshold, and trigger the solenoid from the off state to the on state as long as the previously recorded fluid temperature is less than the temperature threshold and the current input speed is less than the speed threshold.

In a different embodiment of the present disclosure, a method is provided for controlling fluid volume in a reservoir of a transmission. The transmission includes a controller. The method includes providing a retarder coupled to the transmission, an accumulator including an internal cavity, a piston disposed in the internal cavity of the accumulator, a solenoid electrically coupled to the controller, and a valve; storing a set of instructions for controlling the accumulator, piston, solenoid, and valve in the controller; receiving a signal to either perform a startup routine or a shutdown routine; determining if logic for executing the set of instructions is enabled; comparing a fluid temperature to a temperature threshold; enabling the solenoid from an off state to an on state if the fluid temperature is less than the temperature threshold; moving the piston from a first position to a second position in the internal cavity; and discharging an amount of hydraulic fluid from the internal cavity of the accumulator to the reservoir.

In one example of this embodiment, the method includes transferring fluid pressure from the valve to the piston to induce movement of the piston from the first position to the second position in response to the solenoid being enabled to the on state. In a second example, the method includes detecting the fluid temperature with a sensor or locating the fluid temperature stored in a memory of the controller from one of a plurality of previously recorded fluid temperatures. In a third example, the method includes determining a time threshold; and enabling the solenoid in the on state for a period of time equivalent to the time threshold.

In a fourth example, the method includes determining an input speed of the transmission and a speed threshold; comparing the input speed to the speed threshold; and enabling the solenoid to the on state as long as the input speed is less than the speed threshold. In a fifth example, the method includes maintaining the piston in the second position to prevent hydraulic fluid in the transmission from returning to the internal cavity of the accumulator. In a sixth example, the method includes preventing any use of the retarder while the solenoid is enabled in the on state.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
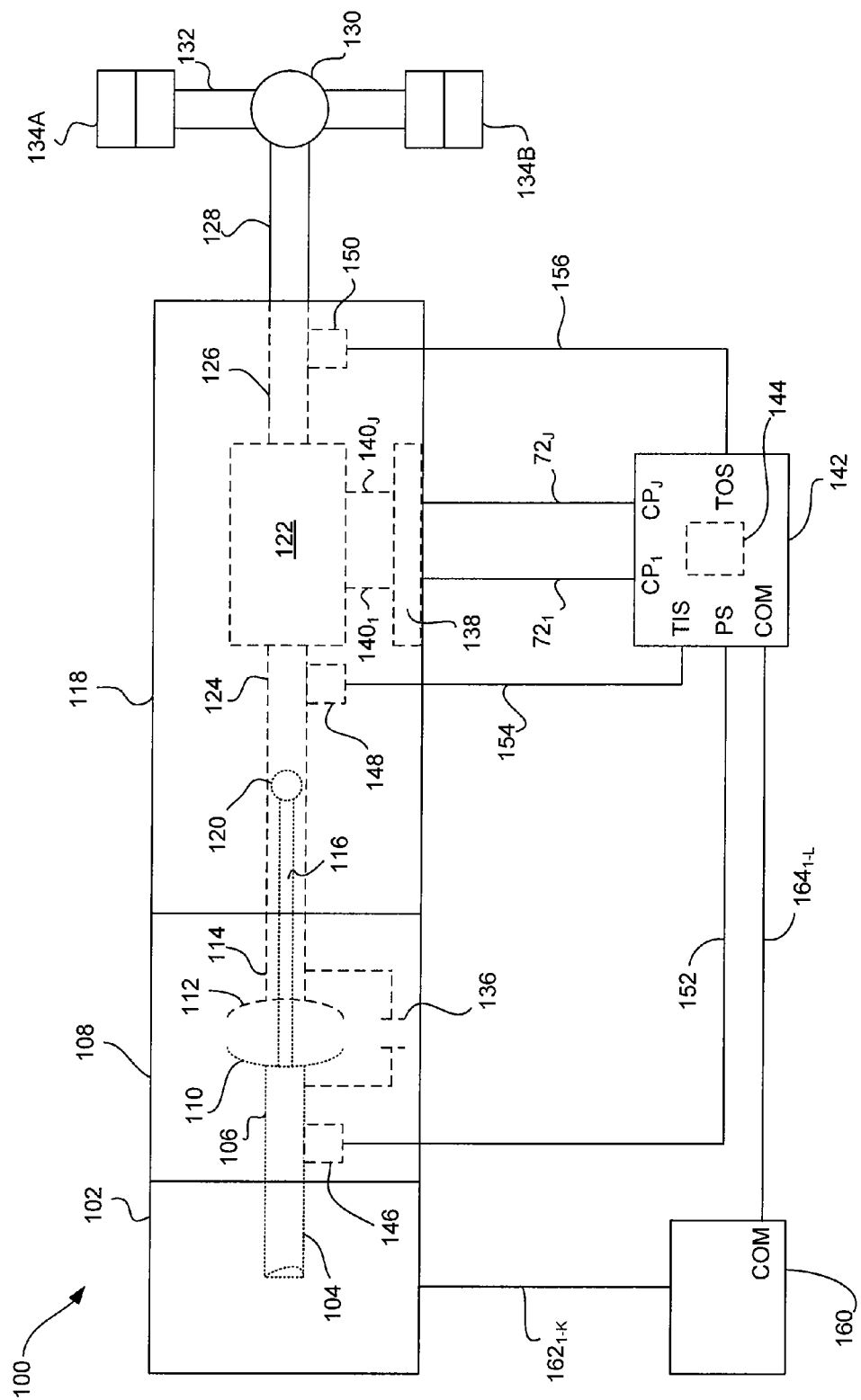
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hard-wired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IES-CAN data bus, GMLAN, Mercedes PT-CAN).

Figure 2:
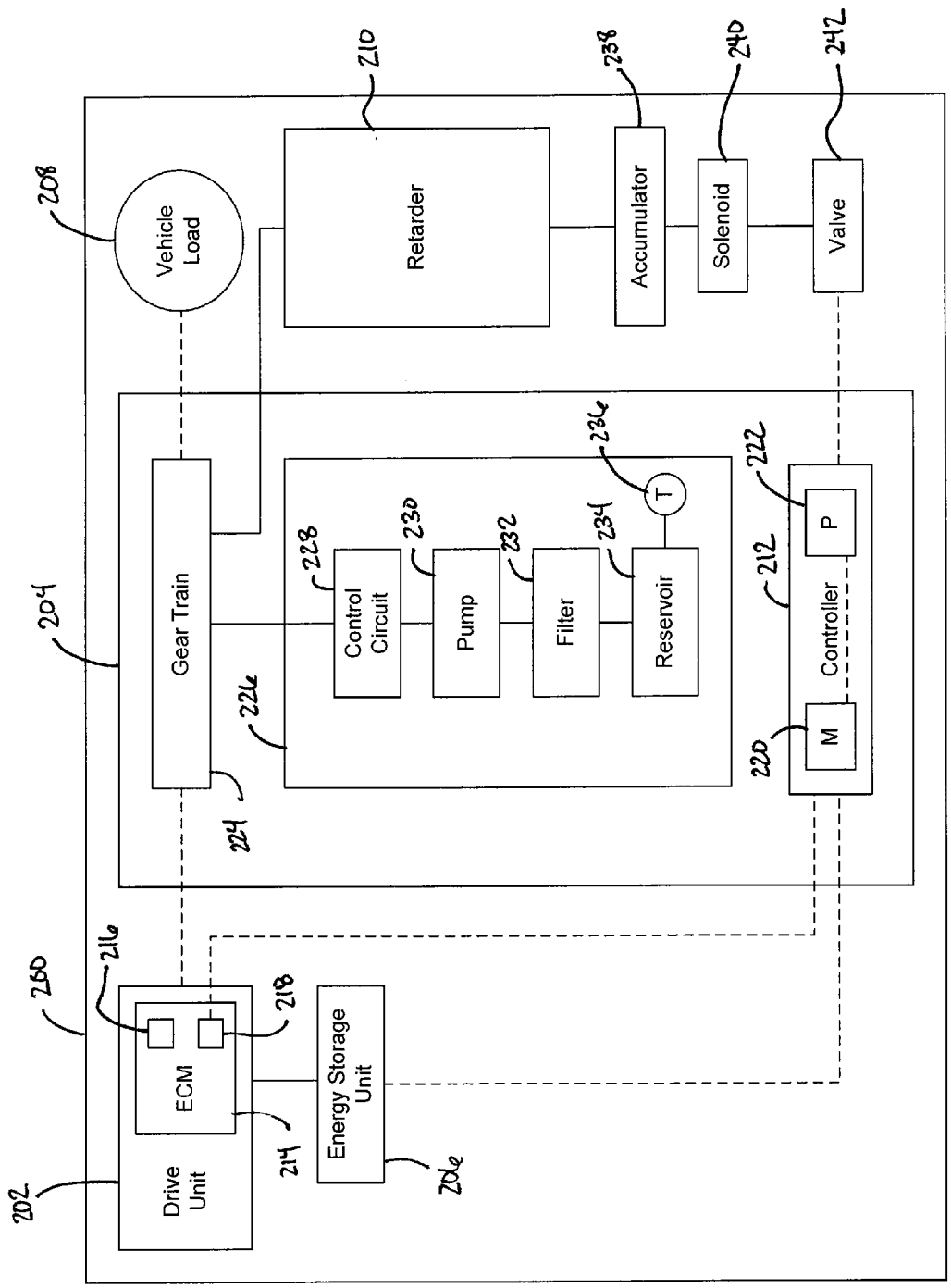
FIG. 2 is a diagrammatic view of a vehicle including a drive unit and the transmission unit of FIG. 1 including a retarder.

Referring to another illustrated embodiment in FIG. 2, a transmission assembly adapted for use in a vehicle 200 includes a transmission 204 and a retarder unit 210 mounted to the transmission 204. The transmission 204 is configured to transmit torque from a drive unit 202 to drive a vehicle load 208 (see FIG. 2) while the drive unit 202 is on (or running). The vehicle 200 also includes an energy storage unit 206.

The drive unit 202 can be an internal combustion engine, for example, including an engine control module (ECM) 214 configured to control the operation of the drive unit 202. The energy storage unit 206 is illustratively embodied as a vehicle battery. In one instance, the energy storage unit 206 is a 12-volt battery that is electrically connected to an alternator. The energy storage unit 206 is electrically coupled to the drive unit 202 to be charged when the drive unit 202 is running.

The transmission 204 illustratively includes a gear train 224, a hydraulic control system 226, and a controller 212 as shown diagrammatically in FIG. 2. The gear train 224 is reconfigurable among a plurality of gear ratios to transmit torque from the drive unit 202 to the vehicle load 208. In an alternative aspect, the gear train 224 may be reconfigurable among a plurality of speed ratios (e.g., in a continuously-variable transmission, an infinitely-variable transmission, etc.). The hydraulic control system 226 is configured to set the gear train 224 in one of the gear ratios or speed ratios as selected by the controller 212. The controller 212 is coupled to the engine control module 214 and the hydraulic control system 226 as shown in FIG. 2. The controller 212 is configured to select a gear ratio or speed ratio for the gear train 224.

The hydraulic control system 226 includes a hydraulic circuit 228, a hydraulic reservoir 234, and a main pump 230 as shown in FIG. 2. A filter 232 can be positioned between the main pump 230 and reservoir 234 to remove any debris or particulates from hydraulic fluid being suctioned from the reservoir 234. The hydraulic circuit 228 is configured to set the gear train 224 in one of the gear ratios or speed ratios as selected by the controller 212 by operating a plurality of valves to engage and disengage a plurality of clutches (not shown). The hydraulic reservoir 234 stores hydraulic fluid for use in the hydraulic circuit 228. The hydraulic reservoir 234 is coupled to the hydraulic circuit 228 through the main pump 230 to establish a main path for pressurized fluid to reach the hydraulic circuit 228. The main pump 230 is mechanically driven by the drive unit 202 to supply pressurized hydraulic fluid from the hydraulic reservoir 234 to the hydraulic circuit 228 when the drive unit 202 is on.

The controller 212 illustratively includes a memory 220 and a processor 222 coupled to the memory 220 and configured to perform instructions stored in the memory 220. Likewise, the engine control module 214 can also include a memory 216 and a processor 218 coupled to the memory 216 and configured to perform instructions stored in the memory 216. In some embodiments, the controller 212 may be included in the engine control module 214 or may be formed from a plurality of control circuits located throughout the vehicle 200.

As previously described, hydraulic fluid volume during startup can be problematic for conventional transmission assemblies when the fluid temperature is cold. This can be particularly the case when the conventional transmission assembly includes additional hardware or components that require hydraulic fluid for operation. For instance, some conventional transmission assemblies include a power take-off assembly for operating a pump or other mechanism. In this example, the transmission assembly may require larger housings or cavities that increases the overall volume of oil. In another example, a conventional transmission assembly can include an integral cooler that requires additional hydraulic fluid for operation. In a different example, a shallower oil pan on the conventional transmission assembly can reduce the amount of hydraulic fluid in the transmission. In a further example, a retarder includes an additional fluid cavity that can affect the amount of hydraulic fluid available during startup. In each of the aforementioned examples, hydraulic fluid can be captured within a cavity and thus reduces the amount of fluid in the reservoir available during startup. In the example of a shallower oil pan, there may actually be less hydraulic fluid in the transmission. In any event, when a conventional transmission assembly includes at least or more of these conditions, higher viscosity fluid can induce problems during a cold startup. With less fluid or higher viscosity fluid in the reservoir, the delay or amount of time for a transmission to reach a desired fluid pressure (or alternatively, the amount of time before a torque converter reaches full capacity) can be significant.

In the illustrated embodiment of FIG. 2 in which the transmission assembly includes a retarder, the retarder includes an accumulator 238 that is capable of storing hydraulic fluid. The accumulator 238 can be any storage device for storing hydraulic fluid and discharging the fluid to assist with applying the retarder more responsively during operation. The accumulator 238 can hold a predefined amount of hydraulic fluid depending upon its size. The charge and discharge of hydraulic fluid to and from the accumulator 238 can be electrically controlled by the transmission controller 212. Although not shown as such, the accumulator 238 can be mounted externally to the transmission 204, although in other embodiments it may be possible to position the accumulator in various locations.

Figure 3:
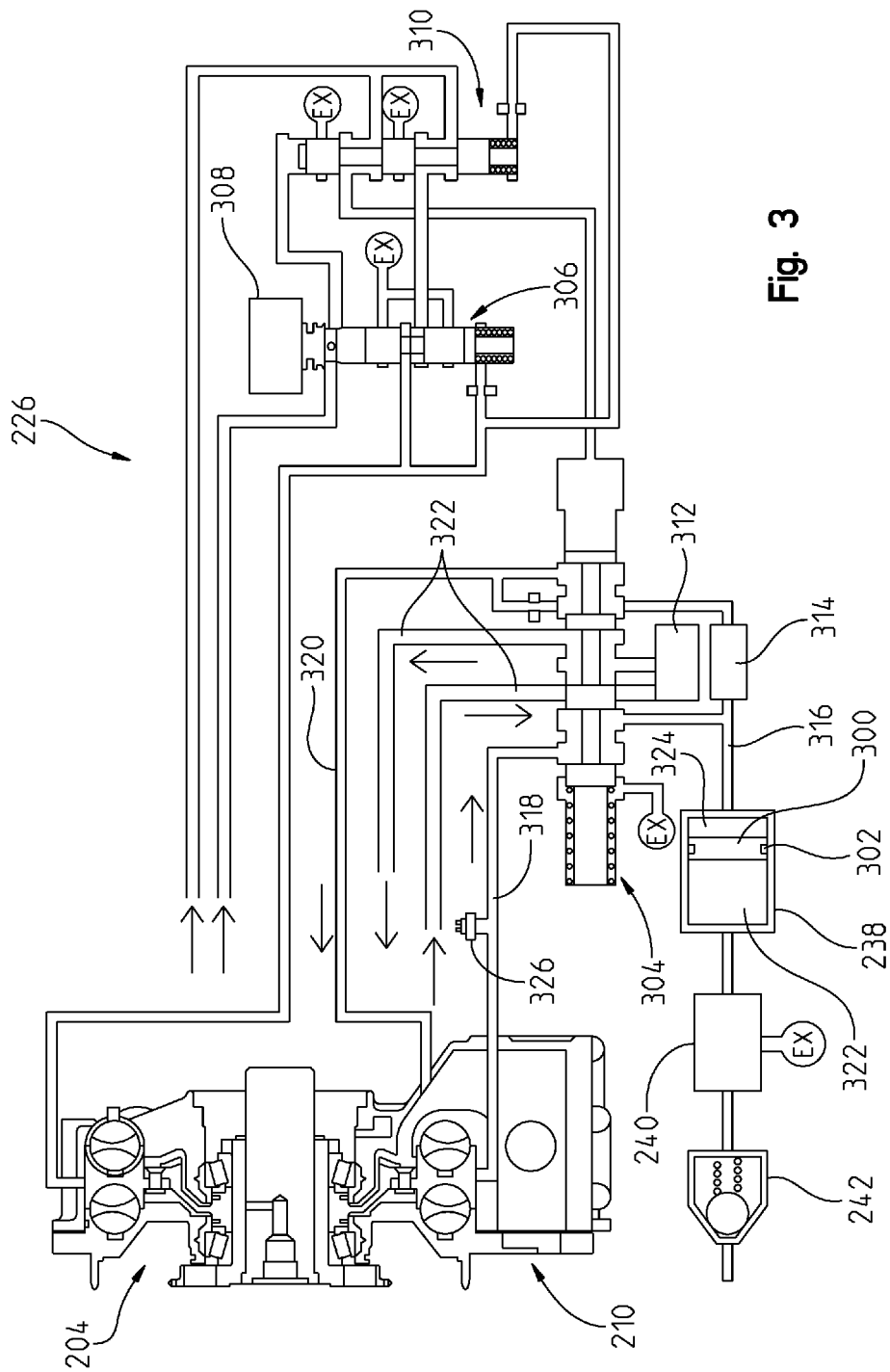
FIG. 3 is a simplified hydraulic schematic of FIG. 2.

In FIGS. 2 and 3, the accumulator 238 can be structurally designed to include a piston 300 and a seal 302. The accumulator 238 includes a defined internal cavity which can store hydraulic fluid. As such, the volume of the internal cavity for holding hydraulic fluid can be adjustably controlled via movement of the piston 300. The hydraulic fluid can be stored on one side 324 of the piston 300, and the seal 302 can reduce or preclude leakage of the fluid from the one side 324 of the piston 300 to an opposite side 322 thereof.

As shown in FIGS. 2 and 3, the piston 300 can be controlled by a valve 242 and solenoid 240. The controller 212 can operably control the stroke of the valve 242 and actuation of the solenoid 240. The valve 242 can be disposed in communication with a fluid such as air, and when the solenoid 240 is activated or enabled, the fluid (e.g., air) can enter the internal cavity of the accumulator 238 and apply pressure to the second side 322 of the piston 300. As the piston 300 is stroked, hydraulic fluid on the first side 324 of the piston 300 can be discharged into a first fluid path 316.

The first fluid path 316 can fluidly couple the accumulator 238 to a cooler 314. In addition, the first fluid path 316 can fluidly couple the accumulator 238 to a flow valve 304. The flow valve 304 can be internally disposed within the hydraulic control system 226 of the transmission 204. As shown in FIG. 3, the fluid can flow through different fluid paths 322 via the flow valve 304. For example, fluid can be directed to a sump cooler 312, a regulator valve 306, a relay valve 310, and the retarder 210. The regulator valve 306 can be stroked via a solenoid 308, as shown in FIG. 3.

Fluid communication between the retarder 210 and the flow valve 304 can be established by a second fluid path 318 and a third fluid path 320. The second fluid path 318 can direct hydraulic fluid from the retarder 210 to the flow valve 304, whereas the third fluid path 320 can direct fluid from the flow valve 304 to the retarder 210. Other fluid paths are possible in other embodiments, and the fluid paths shown and described with respect to FIG. 3 is only intended to be one example.

Referring to FIG. 2, a temperature sensor 236 is shown capable of detecting fluid temperature in the reservoir 234 of the transmission 204. In FIG. 3, a temperature sensor 326 is shown in fluid communication with the second fluid path 318 such that the sensor 326 can detect fluid temperature exiting the retarder 210 and flowing to the flow valve 304. In at least one embodiment, either or both sensors can be in electrical communication with the controller 212 to enable the controller to monitor hydraulic fluid temperature. In one specific embodiment, the temperature sensors 236, 326 can be the same sensor. In a second specific embodiment, the sensors 236, 326 can be different and spaced at different locations along the fluid paths in the transmission 204. In any event, the controller 212 is capable of determining fluid temperature based on the temperature detection of either or both of the temperature sensors 236, 326.

Based on temperature, the controller 212 can operably control the actuation of the solenoid 240. For example, if fluid temperature is above a threshold temperature, the controller can disable the solenoid 240 so that the accumulator 238 is able to store fluid and assist with retarder response (i.e., able to discharge fluid into the retarder). Alternatively, if the fluid temperature is below a threshold temperature, the controller 212 can enable the solenoid 240 so that the piston 300 is stroked and any fluid stored in the internal cavity of the accumulator is discharged into the reservoir 234.

Figure 4:
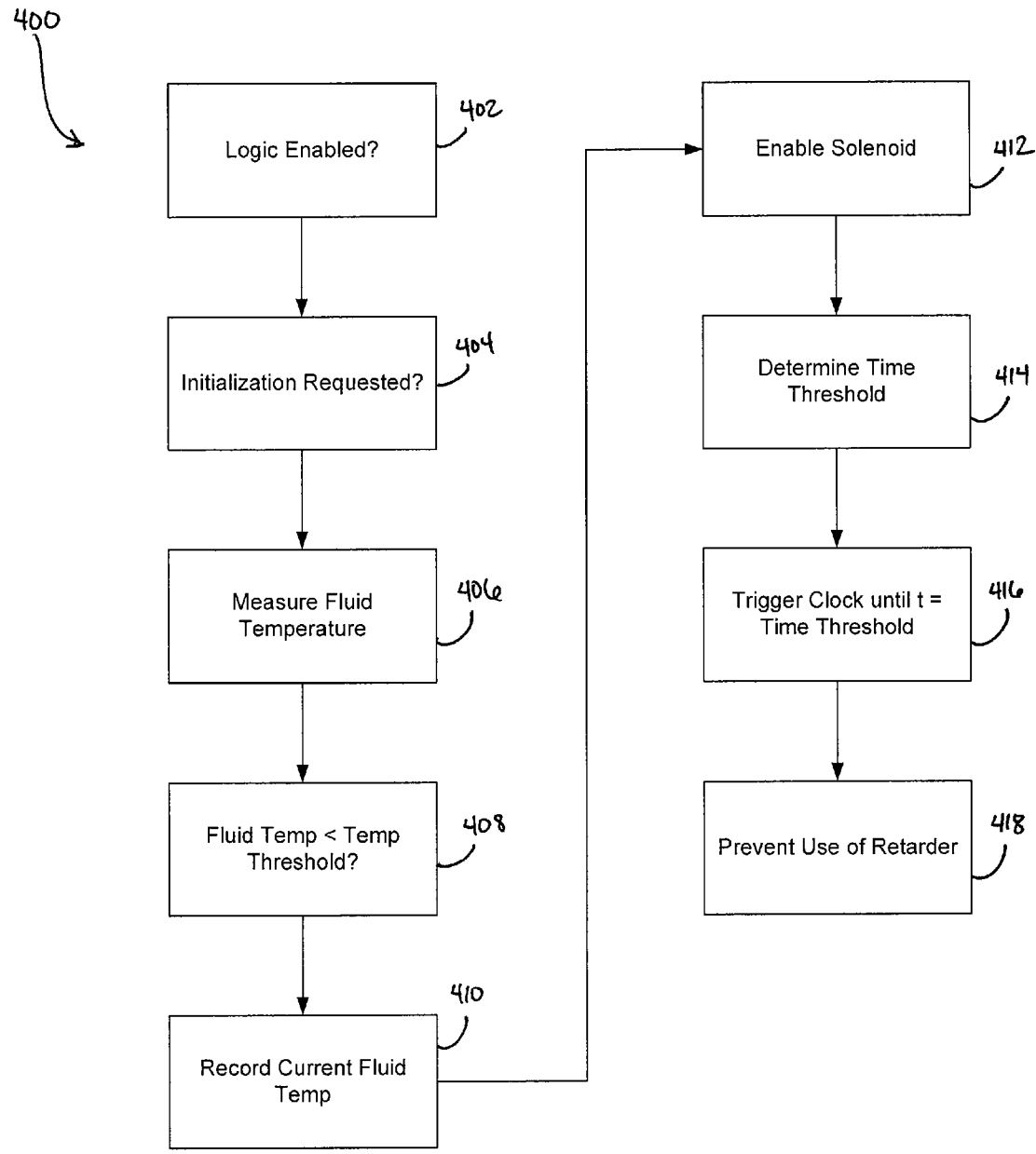
FIG. 4 is a first method of controlling an accumulator prior to shutdown.
Figure 5:
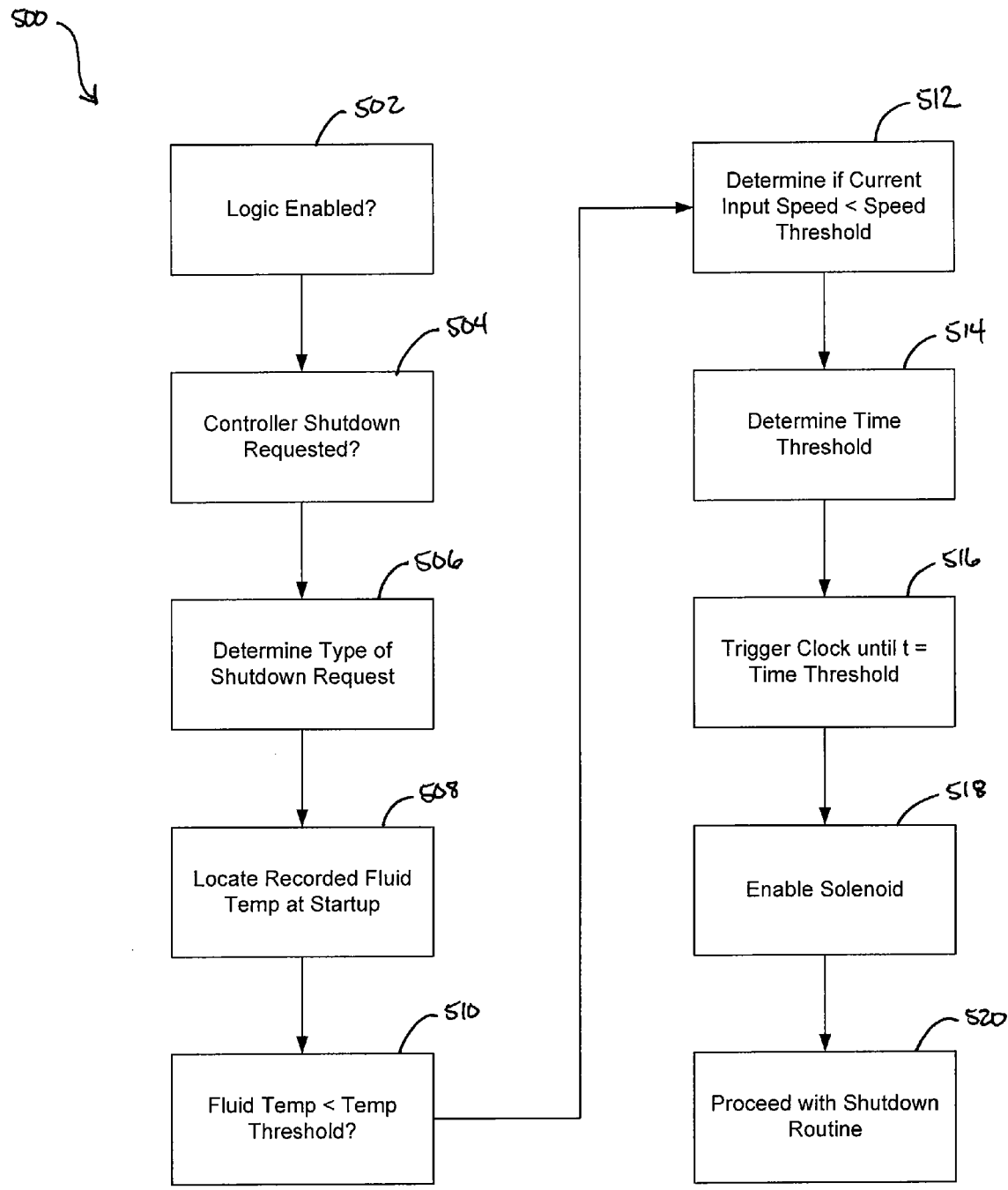
FIG. 5 is a second method of controlling an accumulator prior to shutdown.

The control of the solenoid 240 and accumulator 238 can be set forth in a set of instructions or algorithmic steps stored in the memory 220 of the controller 212 and executed by the processor 222. Examples of these control methods are shown in FIGS. 4 and 5. In each example, a process is in place to ensure or increase the amount of hydraulic fluid in the reservoir 234 under certain conditions, e.g., when the fluid temperature is below a threshold temperature.

Referring to the illustrated embodiment of FIG. 4, a first control process 400 is set forth for performing a set of blocks or conditions. The first control process 400 can be stored in the memory 220 of the controller 212 and executed by the processor 222. Although the blocks of the first control process 400 are shown in a series of steps, it is to be understood that one or more of these blocks or conditions may be performed in various orders. Moreover, one or more of the blocks shown in FIG. 4 may not be included in other embodiments of the first control process 400. Alternatively, there may be additional blocks or conditions performed in other embodiments. Thus, the illustrated embodiment of FIG. 4 only represents a single example of the first control process 400.

In block 402 of the first control process 400, the controller 212 can first determine whether the control logic is enabled to perform this process 400. For example, there may be a user input for triggering the logic between an on and off state. In the on state, the controller 212 may perform the first control process 400, whereas in the off state the controller 212 may be precluded from performing the process. In any event, if the controller 212 determines in block 402 that the logic is enabled, the control process 400 can advance to block 404 where the controller determines whether initialization has been requested. During initialization, solenoids can be energized, the controller can determine if a shift selector is connected, what type of shift selector is connected, J-1939 commands can be transmitted, etc. Following initialization, a drive unit or engine can begin cranking at startup during normal operation.

If the controller 212 determines in block 404 that initialization has been requested, the control process 400 can advance to block 406 where fluid temperature can be detected and communicated to the controller 212. Referring to FIG. 2, the fluid temperature can be detected by the temperature sensor 236 and communicated to the controller 212. In FIG. 3, the temperature sensor 326 can detect fluid temperature. Once the fluid temperature is measured and communicated to the controller 212 in block 406, the control process 400 can advance to block 408 where the controller 212 can compare the detected fluid temperature to a temperature threshold. The temperature threshold can be a predefined value stored in the memory 220 of the controller 212. Alternatively, the threshold can be stored in a lookup table, chart, graph, or other similar means stored in the memory 220. In this instance, the processor can retrieve the threshold so that the controller 212 can make the comparison in block 408. If the measured fluid temperature is less than the threshold, then the first control process 400 can advance to block 410. If not, the first control process 400 may terminate or return to block 402. Alternatively, the control process may advance to block 410 under either result of block 408, but if the temperature is greater than the threshold as determined in block 408, then the control process 400 will not advance to block 412 until the fluid temperature is less than the threshold.

In block 410, the controller 212 can store the detected temperature in its memory 220. If, in block 408 the fluid temperature is less than the threshold temperature, the first control process 400 can advance to block 412 where the controller 212 can enable or energize the solenoid 240. In doing so, fluid pressure can be applied to the second side 322 of the piston 300 to stroke the piston 300 and discharge any hydraulic fluid from the accumulator 238 to the reservoir 234. The fluid pressure can be air pressure supplied by an air-actuated valve 242 and solenoid 240. Alternatively, other types of known fluids can be used to apply the piston 300 once the solenoid 242 is enabled in block 412.

Once the solenoid 240 is enabled in block 412, the first control process 400 can advance to block 414 where the controller 212 can determine a time threshold. The condition set forth in block 414 can be performed by the controller 212 to prevent hydraulic fluid in the first fluid path 316 from stroking the piston 300 to its unstroked position. The unstroked position can be defined as a position in which the piston 300 is disposed such that hydraulic fluid can enter through the side 324 of the accumulator 238 and move the piston 300 towards the solenoid 240 (e.g., see FIG. 3). By contrast, the stroked position can be defined such that the piston 300 is moved away from the solenoid 240 in FIG. 3 and there is little to no volume in the accumulator 238 for hydraulic fluid to be stored.

Under startup conditions, it may be desirable to prevent the piston from moving from the stroked position to the unstroked position, and as such fluid pressure can be applied to the second side 322 of the piston 300 to maintain it in the stroked position for a period of time. The period of time can be determined from a look up table, a graph, a calculation, chart, or other known means. In one non-limiting example, a look up table can be stored in the memory 220 of the controller 212. The look up table can include a time versus temperature arrangement and therefore the controller 212 can determine the period of time threshold in block 414 based on the detected fluid temperature from block 406.

The time threshold can be greater when the fluid temperature is colder. For example, at −40° C. the time threshold may be approximately 5 minutes. At −20° C., the time threshold may be approximately 2 minutes and at 0° C. the time threshold may be approximately 30 seconds. These are provided only as an example and other embodiments may include other defined time periods based on fluid temperature.

In the illustrated embodiments of FIGS. 2 and 3 the piston 300 is hydraulically-actuated, i.e., it moves based on hydraulic pressure applied to either side thereof. However, in alternative embodiments, a spring may be disposed on either side of the piston to incorporate a hydraulic/mechanical actuation to the piston. Other known mechanisms can be used in other embodiments to move the piston 300. In addition, the piston 300 is only one example of how fluid can be charged and discharged from the accumulator 238. Other mechanisms including a valve that opens and closes the internal cavity of the accumulator 238 may be used as well.

Once the time threshold is determined in block 414, the controller 212 can include an internal timer that is triggered for the determined amount of time in block 416. During this time, fluid pressure is applied to the second side 322 of the piston 300 to maintain it in its stroked position. Any hydraulic fluid from the first flow path 316 is unable to move the piston 300 due to the fluid applied to the second side 322.

The first control process 400 can also advance to block 418 where the controller 212 prevents the accumulator 238 from being used to apply the retarder 210. Once the time threshold elapses in block 416, the first control process 400 is disabled or ends and the piston 300 can de-stroke to a position where fluid can enter the accumulator 238 and be used to apply the retarder 210.

The first control process 400 provides a series of blocks or conditions that can be stored in the memory 220 of the controller 212 and executed by the processor 222 at startup (e.g., when a vehicle operator triggers an ignition key or button to startup). Although not described above, in one embodiment the control process 400 can execute block 402 by obtaining a previously recorded fluid temperature stored in the memory 220. For instance, this previously recorded fluid temperature may be from the day before or the last time the vehicle was operated. If the previously recorded fluid temperature was below the temperature threshold (as previously determined in block 408), the logic may be automatically enabled in block 402. Alternatively, if the temperature was above the temperature threshold, the first control process 400 may only be executed if the measured fluid temperature in block 406 (i.e., a real-time fluid temperature at startup) satisfies the condition set forth in block 408. Otherwise, the first control process 400 may not be executed since the fluid temperature is not determined to be cold enough to trigger the process. In any event, the controller 212 may still record the measured fluid temperature for a subsequent vehicle startup.

A second control process 500 is shown in FIG. 5. The second control process 500 can include a series of blocks or conditions that can be stored in the memory 220 of the controller 212 and executed by the processor 222 when a request to shutdown is received by the controller 212. Similar to the first control process 400, the second control process 500 can include a first block 502 that is executed by the processor 222 to determine if a control logic is enabled. If the controller 212 determines that the control logic is enabled in block 502, the second control process 500 can advance to block 504. If the control logic is disabled, the second control process 500 ends until the control logic is enabled.

In block 504, a determination is made whether the controller 212 is requested to shutdown. If the vehicle is shutdown (e.g., operator shuts down vehicle via ignition key or button), then a signal is communicated to the controller 212 to initiate shutdown. In this instance, the controller 212 determines in block 504 that the controller 212 is being commanded to shutdown. As such, the second control process 500 can advance to block 506 where the controller 212 determines what type of shutdown request is being commanded. For example, a normal shutdown request to the controller 212 may result in the vehicle being turned off. However, in other instances, the drive unit 202 or engine may include software or a set of instructions to shutdown under an idle condition when the vehicle comes to a stoplight, for example. Here, the vehicle is not turned off but rather the engine may temporarily shut off for fuel economy reasons. In any event, if this type of shutdown request is being communicated to the controller 212, then the result of block 506 is not the type of shutdown request in which the second control process 500 advances past block 506. On the other hand, if the vehicle is being completely turned off, this type of request is received by the controller 212 and the second control process 500 can advance to block 508.

In block 508, the controller 212 can locate a previously recorded fluid temperature (e.g., one that was recorded at startup as previously described) from its memory 220. In one embodiment, the memory 220 can store a plurality of recorded fluid temperatures. In another embodiment, the memory 220 may only record one fluid temperature at a time, and thus it erases old fluid temperatures and records only the most recently detected temperature. In any event, in block 508, the processor 222 can locate the most recently recorded fluid temperature or one of the most recently recorded temperatures and the second control process 500 can advance to block 510.

In block 510, the controller 212 can compare the recorded fluid temperature to a temperature threshold. The temperature threshold can be determined similar to how it is determined in block 408. In one instance, the temperature threshold can be a predefined temperature stored in the memory 220 of the controller 212. In other aspects, the temperature threshold may be determined based on a calculation of previously recorded temperatures or according to other known methods. For example, a lookup table can be stored in the memory 220 and temperature threshold values may be determined based on previously recorded fluid temperatures, outdoor or environmental temperatures, etc. In any event, in block 510 the controller 212 can compare the recorded fluid temperature to the temperature threshold.

If the fluid temperature is less than the temperature threshold in block 510, the second control process 500 can advance to block 512 where input speed is compared to a speed threshold. If the condition set forth in block 510 is not satisfied, then the second control process 500 ends and the controller 500 can proceed with normal shutdown procedures. In block 512, however, speed sensors or communication signals sent over communication links (e.g., J-1939) can communicate a current input speed to the controller 212. The processor 222 can determine a speed threshold from the memory 220 of the controller 212. The speed threshold can be a predefined value stored in the memory 220, for example. Other methods for determining speed threshold can be employed in block 512. Moreover, the controller 212 can repeatedly perform block 512 until the current input speed falls below the speed threshold. Once the condition set forth in block 512 is satisfied, the second control process 500 can advance to blocks 514, 516, and 518.

Blocks 514, 516, and 518 can be performed by the controller 212 in any order or at the same time. In any event, the solenoid 240 can be energized or enabled in the same manner as described in block 412. Likewise, the time threshold in block 514 can be determined similarly as in block 414 and the internal timer can be triggered for the time period in block 516 similar as in block 416. By energizing or enabling the solenoid 240, any hydraulic fluid in the accumulator 238 can be discharged to the reservoir 234 to increase the fluid volume therein and assist with startup procedures. As more hydraulic fluid is returned to the reservoir 234, torque converter capacity can be reached more quickly even when the fluid temperature is low and viscosity is high. Once the piston 300 is stroked and fluid is expelled from the accumulator 238, the controller 212 can proceed with a normal shutdown routine in block 520 of the second control process 500. For instance, in block 520, electrical components of the control system 226 can be de-energized, the datalink can be shutdown, shift adaptive values can be stored in the memory 220, etc. Additional procedures can be performed during the shutdown routine.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for increasing a volume of hydraulic fluid in a reservoir of a transmission, comprising:
    providing a retarder mounted to the transmission, an accumulator including an internal cavity, a piston disposed in the internal cavity of the accumulator, a solenoid, a valve, a cooler and a controller;
    enabling the solenoid from an off state to an on state;
    transferring fluid pressure from the valve to the piston;
    moving the piston from a first position to a second position in the internal cavity;
    discharging an amount of hydraulic fluid from the internal cavity of the accumulator to the reservoir to assist with a startup procedure and not discharging the amount of hydraulic fluid through the cooler; and
    increasing the volume of hydraulic fluid in the reservoir.

2. The method of claim 1, further comprising:
    detecting a fluid temperature with a sensor; and
    comparing the detected fluid temperature to a temperature threshold.

3. The method of claim 2, wherein the enabling step is performed only if the detected fluid temperature is less than the temperature threshold.

4. The method of claim 2, further comprising storing the detected fluid temperature in a memory of the controller.

5. The method of claim 1, further comprising:
    locating a previously detected fluid temperature from a memory of the controller; and
    comparing the previously detected fluid temperature to a temperature threshold.

6. The method of claim 1, further comprising:
    determining a time threshold; and
    enabling the solenoid in the on state for a period of time equivalent to the time threshold.

7. The method of claim 1, further comprising maintaining the piston in the second position to prevent hydraulic fluid in the transmission from returning to the internal cavity of the accumulator.

8. The method of claim 1, further comprising preventing any use of the retarder while the solenoid is enabled.

9. A method for increasing a volume of hydraulic fluid in a reservoir of a transmission, comprising:
    providing a retarder mounted to the transmission, an accumulator including an internal cavity, a piston disposed in the internal cavity of the accumulator, a solenoid, a valve, and a controller;
    enabling the solenoid from an off state to an on state;
    transferring fluid pressure from the valve to the piston;
    moving the piston from a first position to a second position in the internal cavity;
    discharging an amount of hydraulic fluid from the internal cavity of the accumulator to the reservoir;
    increasing the volume of hydraulic fluid in the reservoir;
    determining an input speed of the transmission and a speed threshold;
    comparing the input speed to the speed threshold; and
    enabling the solenoid to the on state as long as the input speed is less than the speed threshold.

10. A vehicular system, comprising:
    a drive unit;
    a transmission coupled to the drive unit for receiving power;
    a controller for controlling the transmission, the controller including a memory and a processor;
    a hydraulic control system of the transmission including a reservoir, a pump, a cooler, and a control circuit;
    a retarder operably coupled to the transmission;
    an accumulator fluidly coupled to the control circuit, reservoir and retarder, the accumulator including a defined internal cavity for receiving hydraulic fluid;
    a piston disposed within the internal cavity, the piston being movable between a first position and a second position; and
    a valve and a solenoid in fluid communication with the piston, the solenoid being in electrical communication with the controller such that the solenoid is controllable between an on state and an off state;
    wherein, in the off state the piston is free to move between the first and second positions so that hydraulic fluid can enter the internal cavity of the accumulator, and in the off on state the piston is moved to the second position to discharge any hydraulic fluid from the internal cavity of the accumulator to the reservoir to assist with a startup procedure and not through the cooler.

11. The vehicular system of claim 10, further comprising a set of instructions stored in the memory and executable by the processor to detect a fluid temperature, compare the detected fluid temperature to a temperature threshold, and trigger the solenoid from the off state to the on state.

12. The vehicular system of claim 11, wherein the set of instructions stored in the memory is executable by the processor to determine a time threshold, trigger a clock at t=0, and energize the solenoid in the on state from t=0 to t=time threshold.

13. The vehicular system of claim 10, further comprising a set of instructions stored in the memory and being executable by the processor to compare a previously recorded fluid temperature to a temperature threshold, determine a current input speed, compare the current input speed to a speed threshold, and trigger the solenoid from the off state to the on state as long as the previously recorded fluid temperature is less than the temperature threshold and the current input speed is less than the speed threshold.

14. A method for controlling fluid volume in a reservoir of a transmission, the transmission including a controller, comprising:
    providing a retarder coupled to the transmission, an accumulator including an internal cavity, a piston disposed in the internal cavity of the accumulator, a cooler, a solenoid electrically coupled to the controller, and a valve;
    storing a set of instructions for controlling the accumulator, piston, solenoid, and valve in the controller;
    receiving a signal to either perform a startup routine or a shutdown routine;
    determining if logic for executing the set of instructions is enabled;
    comparing a fluid temperature to a temperature threshold;
    enabling the solenoid from an off state to an on state if the fluid temperature is less than the temperature threshold;

moving the piston from a first position to a second position in the internal cavity; and discharging an amount of hydraulic fluid from the internal cavity of the accumulator to the reservoir to assist with a startup procedure and not discharging the amount of hydraulic fluid through the cooler.

15. The method of claim 14, further comprising transferring fluid pressure from the valve to the piston to induce movement of the piston from the first position to the second position in response to the solenoid being enabled to the on state.

16. The method of claim 14, further comprising detecting the fluid temperature with a sensor or locating the fluid temperature stored in a memory of the controller from one of a plurality of previously recorded fluid temperatures.

17. The method of claim 14, further comprising:
determining a time threshold; and
enabling the solenoid in the on state for a period of time equivalent to the time threshold.

18. The method of claim 14, further comprising maintaining the piston in the second position to prevent hydraulic fluid in the transmission from returning to the internal cavity of the accumulator.

19. The method of claim 14, further comprising preventing any use of the retarder while the solenoid is enabled in the on state.

20. A method for controlling fluid volume in a reservoir of a transmission, the transmission including a controller, comprising:
providing a retarder coupled to the transmission, an accumulator including an internal cavity, a piston disposed in the internal cavity of the accumulator, a solenoid electrically coupled to the controller, and a valve;
storing a set of instructions for controlling the accumulator, piston, solenoid, and valve in the controller;
receiving a signal to either perform a startup routine or a shutdown routine;
determining if logic for executing the set of instructions is enabled;
comparing a fluid temperature to a temperature threshold;
enabling the solenoid from an off state to an on state if the fluid temperature is less than the temperature threshold;
moving the piston from a first position to a second position in the internal cavity; and
discharging an amount of hydraulic fluid from the internal cavity of the accumulator to the reservoir;
determining an input speed of the transmission and a speed threshold;
comparing the input speed to the speed threshold; and
enabling the solenoid to the on state as long as the input speed is less than the speed threshold.

* * * * *